Figure 1:
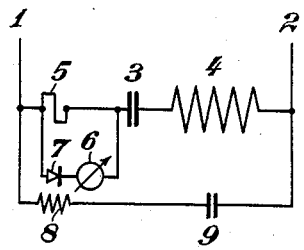

Dec. 27, 1932.　　　　G. KEINATH　　　　1,892,401
FREQUENCY MEASURER
Filed Jan. 8, 1931　　　2 Sheets-Sheet 1

Inventor:
Georg Keinath
by
Lorand Kehlenbeck
Attorneys.

Dec. 27, 1932.  G. KEINATH  1,892,401
FREQUENCY MEASURER
Filed Jan. 8, 1931   2 Sheets-Sheet 2

Inventor:
Georg Keinath
by Loukax Kehlenbeck
Attorneys.

Patented Dec. 27, 1932

1,892,401

UNITED STATES PATENT OFFICE

GEORG KEINATH, OF BERLIN-CHARLOTTENBURG, GERMANY, ASSIGNOR TO SIEMENS & HALSKE, AKTIENGESELLSCHAFT, OF SIEMENSSTADT NEAR BERLIN, GERMANY, A CORPORATION OF GERMANY

FREQUENCY MEASURER

Application filed January 8, 1931, Serial No. 507,423, and in Germany January 17, 1930.

The invention relates to a frequency measurer. It is known with indicator frequency measurers, to use the shift in phase in a resonance circuit which is tuned to the mean frequency to be measured. Here, the phase displacements in the resonance circuit which take place with variations of the frequency from its mean value, influence the turning moment exerted on each other of two coils, of which one is stationary in the resonance circuit, while the other is movable and traversed by a current, the phase of which is displaced by 90° with respect to the voltage. In order here to be independent of the current strength in the resonance circuit, a second movable coil is used as the directing force, which coil is in mutually inductive relation with the fixed coil and consequently tends to place itself perpendicularly thereto. This known arrangement necessitates an expensive special measuring instrument so that on account of its price alone, it has met with but little demand.

According to the invention, the phase shift in a resonance circuit tuned to the mean measurement frequency is utilized for the frequency measurement, using a mechanical rectifier which is energized by the frequency to be measured, and through which is supplied a measuring apparatus sensitive to current direction, for example a rotating coil instrument, from the resonance circuit. Through the rectifier, sections of only about one-half period length of the current flowing in the resonance circuit are carried in each period, to the measuring instrument. With a variation of the phase in the resonance circuit, while the length of these sections remains constant, the ratio of the oppositely directed half wave portions supplied through the mechanical rectifier to the measuring instrument, varies so that the throw of the instrument undergoes a corresponding change.

It is particularly suitable if the phase of the current energizing the rectifier is so adjusted that with resonance in the oscillation circuit like parts of oppositely directed half waves are supplied to the direct current instrument. If as the measuring instrument such a one is selected having the zero point in the centre of the scale, then with resonance in the oscillation circuit, that is, at the mean value of the frequency to be measured, the pointer of the measuring instrument will stand at the centre of the scale or zero. According to whether the frequency rises or falls the phase in the oscillating circuit is displaced in one direction or the other, so that increasing portions of the positive or the negative half waves flow to the measuring instrument and deflect the measuring instrument to one side or the other.

Figure 2:
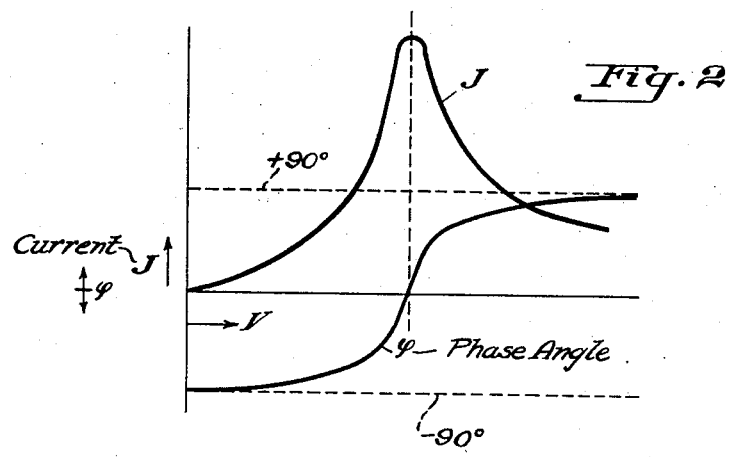
Figure 3:
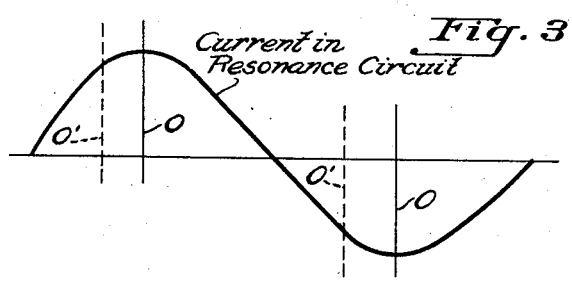
Figure 4:
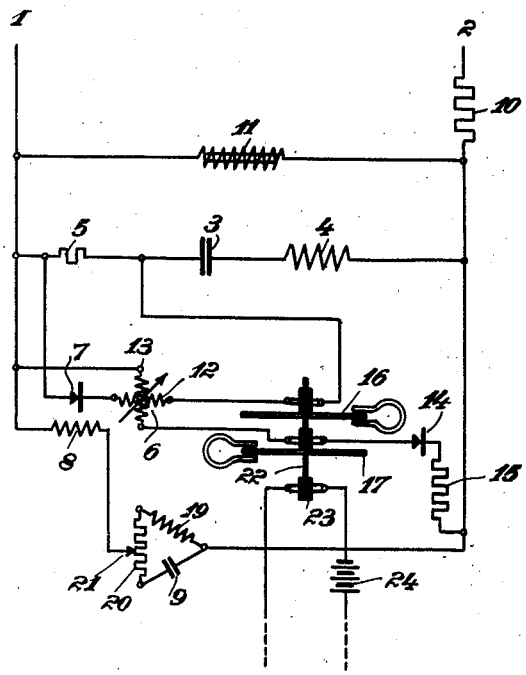

In the accompanying drawings, Fig. 1 is a diagrammatic view illustrating an apparatus embodying my present invention; Figs. 2 and 3 are diagrams illustrating certain electrical relations hereinafter referred to; and Fig. 4 is a largely diagrammatic view showing another embodiment of my invention.

The main connections of a frequency measurer according to the invention are shown in Fig. 1 of the drawings. The frequency to be measured is supplied to the apparatus at 1 and 2. The oscillation circuit consists of a capacity 3 and an inductance 4. 5 is an ohmic resistance in the resonance circuit. Parallel to this a direct current measuring instrument 6 is connected in series with the interrupter contacts of a mechanical rectifier 7. 8 is the energizing winding of the mechanical rectifier, the current phase of which is displaced by a condenser 9 by 90° with respect to the feed voltage. Only such constructions are suitable for rectification for the purpose of the invention in which the natural frequency of the oscillating part cannot produce any interference, and consequently preferably lies well above the frequency to be measured, and in which rebounds do not affect the fixed contact. These requirements are fulfilled to a satisfactory extent by the diaphragm rectifier recently produced.

The method of operation of the circuit described will be easily understood with reference to Figs. 2 and 3. Fig. 2 shows, first, the dependence of the current and the phase in the resonance circuit, on the frequency.

The frequency is assumed as rising from left to right. The ordinate indicated by a dotted line represents the resonance frequency. The current J is indicated by ordinates, as is also the phase angle, positive values of such angle being indicated above the abscissa axis, and negative values below such axis. The 90° values of the phase are indicated by the two horizontal dotted lines. It will be seen from Fig. 2 that in the neighborhood of the resonance point the phase angle is shifted very considerably, the shift within a certain small range occurring according to a practically straight line. It is intended that the measurement should take place within this small range.

Fig. 3 shows how this phase shift acts on the measuring instrument. This figure illustrates one complete period or cycle of the voltage connected with the resistance 5 or of the current flowing through this resistance. The same voltage is applied to the branch circuit containing, in series connection, the measuring instrument 6 and the contact 7 of the mechanical rectifier. First the excitation of the rectifier, as regards its phase, is adjusted by means of the condenser 9 in such a manner that at the resonance frequency of the circuit, the rectifier contact will be opened exactly at the apex of the curve. Thus the measuring instrument will receive two portions of the two half-waves, which lie, for instance, between the ordinates O indicated by full lines in Fig. 3. The two areas of the curve (above and below the abscissa axis respectively) being equal, there will be no deflection of the measuring instrument. If now, owing to a change in frequency, the phase is shifted in the resonance circuit, and therefore in the resistance 5, while the exciter phase of the rectifier remains unaltered, then the direct current measuring instrument 6 will receive, via the contact 7, two portions of the half-waves, which lie, for instance, between the ordinates O' indicated by dotted lines. It will be seen that in this case the two areas of the curve (above and below the abscissa axis respectively) are unequal, and as a consequence the pointer of the measuring instrument will be deflected in one direction. If the phase shift had been toward the other side of the resonance point, the ordinates O' would be on the right of the ordinates O (instead of on the left), and thus the area below the abscissa axis would be greater than that above such axis, and the pointer of the measuring instrument would be deflected in the opposite direction to the one in the case first referred to.

It will be noted that the strength J of the current affects the measurement, since the voltage at the ends of the resistance 5 depends on the strength of the current. This influence of the current strength is a disturbing factor, and in order that its magnitude may be estimated, the current curve J has been plotted in Fig. 2. This curve has a maximum at the resonance point. In the neighborhood of this maximum, the current curve J drops but gradually, and since it is intended to measure only the frequencies in the vicinity of the resonance point, the current variations will be relatively small within such intended range of measurement, and may be disregarded when no great accuracy is required, or calibrated in case a high degree of accuracy is desired.

The apparatus above described in its principal connection, can be modified suitably to correspond to the requirements of practice. Thus, for example, if the condenser 9 is not sufficient for the desired adjustment of the energizing current for the rectifier, other known means for this purpose can be used, as for example variable choking coils, or the like.

In particular, means can be provided to make the indications independent of potential fluctuations. An indicating instrument particularly suitable for this purpose consists of a cross coil instrument, the coil of which producing the directional force is supplied through any desired rectifier, as for example a cuprous oxide rectifier, from the voltage to be measured. A constant voltage circuit can, however, be used for the supply of the resonance circuit.

The invention is not limited to the use of a direct current measuring instrument as an indicator. In place of this, for instance, an ampere hour meter can be employed as the direct current measuring apparatus if, say, the frequency measured is to be converted into an impulse frequency which is to be transmitted to a distance, and there utilized to actuate an indicating instrument. Here, a constant turning moment may be given to the meter and the positive or negative measured turning moment produced by the frequency variations may be superposed on the said turning moment. The measured turning moment may, however, be alone allowed to act on the meter, but in this case the direction of rotation of the meter must be transmitted to the receiving station by separate means. Finally, this last-mentioned difficulty may be got over by so adjusting the energizing phase of the rectifier that the direct current does not reverse its direction but simply fluctuates over the measurement range between a maximum value and a minimum value. Here, certainly, a reduction of the measurement range would have to be accepted.

Fig. 4 illustrates an example embodying the features referred to above. The parts numbered from 1 to 9 are the same as the corresponding parts of Fig. 1. Instead of being connected directly with the mains or conductors 1, 2, as in Fig. 1, the resonance circuit is connected with such conductors with the interposition of an ohmic resistance 10.

In a shunt connection to the resonance circuit is arranged a strongly saturated choke coil 11, which suppresses a material portion of the voltage fluctuations. The remaining portion of these fluctuations will have no influence on the measurement, since the measuring instrument 6 consists of two coils 12 and 13 crossing each other at 90°. The coil 12 is traversed by the current to be measured, branched off from the resistance, while the coil 13 is connected with the terminals of the resonance circuit by way of the rectifier 14 of any desired type (for instance, a cuprous oxide rectifier) and a resistance 15. In the circuits of the two coils 12, 13 are included the armatures 16 and 17 respectively of a meter the purpose of which is explained below. Owing to the connections described, the adjustment of the measuring instrument 6 is also independent of the residual fluctuations of the voltage existing at the terminals of the resonance circuit, because the directing power exerted by the coil 13 varies in direct ratio to the fluctuations of the voltage, and the directing force of the coil 12 likewise varies in direct ratio to the terminal voltage of the resonance circuit. For adjusting the phase of the energizing coil 8, I do not, as in Fig. 1, employ a simple tuned condenser, but in Fig. 4 the adjustment is facilitated by the fact that parallel to the condenser 9 there is connected an inductance 19 in connection with an ohmic resistance 20; by adjusting the sliding contact 21, the capacity 9 and the inductance 19 can be brought selectively to act in any desired ratio on the energizing circuit.

The double meter provided with the armatures 16 and 17 serves for transmitting the frequency measured, to considerable distances. For this purpose both armatures are secured to the same shaft 22 carrying at its lower end a collector 23. Diametrically opposite collector strips may be connected with each other conductively, while adjoining collector strips are separated by relatively large gaps. It will be understood that as the collector 23 rotates, the circuit of the battery 24 will be alternately opened and closed thereby sending impulses into the line, and the number of these impulses will at a distant point indicate in any suitable manner the velocity at which the meter is rotating. The armature 17 of the meter is in circuit with the coil 13 of the measuring instrument 6, and therefore receives a voltage proportional to the terminal voltage of the resonance circuit; the armature 17 therefore tends to rotate proportionally to such terminal voltage. The armature 16 is in circuit with the measuring coil 12 of the measuring instrument 6, and therefore receives current impulses, the mean value of which (referred to direct current) depends as to its magnitude and as to its direction, on the deviations of the frequency to be measured from the resonance frequency of the resonance circuit. According to the direction of this mean value, the armature 16 will have an accelerating or a retarding influence on the torque produced by the armature 17, and will thus increase or decrease the speed at which the meter rotates, so that at the distant point, by observing the deviation of the impulse frequency received, from a normal or standard comparison value, proper deductions can be drawn as to the frequency deviations occurring at the place of measurement. It is true that in this type of transmission to a distance, certain slight errors will occur which are due to the voltage fluctuations at the terminals of the resonance circuit. If desired, these errors may be eliminated, for instance, by connecting, in parallel to the armature 17, a resistance affected by the current; in this way the strength of the current in the armature will be made practically independent of voltage fluctuations at the brushes. The meter whose shaft is indicated at 22, is an ampere-hour meter.

The use of a mechanical rectifier at 7 offers particular advantages over other rectifiers, and particularly vacuum tube rectifiers, in that much greater accuracy can be obtained in the measurements, and moreover, a mechanical rectifier has an almost unlimited life, and does not alter its characteristics materially as time goes on, whereas a vacuum tube rectifier not only has a relatively short life, but deteriorates considerably during use, so that its indications very soon become unreliable.

I claim:

1. In a frequency measurer a resonance circuit tuned to the proper value of the frequency to be measured, a mechanical rectifier energized by the frequency to be measured, a current sensitive measuring apparatus, and connections between said apparatus and said resonance circuit, said connections including the interrupter of said mechanical rectifier.

2. In a frequency measurer a resonance circuit tuned to the proper value of the frequency to be measured, a mechanical rectifier energized by the frequency to be measured, a current sensitive measuring apparatus, connections between said apparatus and said resonance circuit, said connections including the interrupter of said mechanical rectifier and means for adjusting the phase of the current energizing the rectifier in such manner that with resonance of the oscillating circuit exactly like parts of oppositely directed half waves are rectified so that the measuring instrument, the zero point of which lies in the centre of the scale, remains unaffected with the proper frequency.

3. In a frequency measurer a resonance circuit tuned to the proper value of the frequency to be measured, a mechanical rectifier energized by the frequency to be measured, a current sensitive measuring apparatus, connections between said apparatus and said resonance circuit, said connections including the interrupter of said mechanical rectifier, means for adjusting the phase of the current energizing the rectifier in such manner that with resonance of the oscillating circuit exactly like parts of oppositely directed half waves are rectified so that the measuring instrument, the zero point of which lies in the centre of the scale, remains unaffected with the proper frequency and means for keeping the voltage constant at the terminals of the resonance circuit.

4. In a frequency measurer a resonance circuit tuned to the proper value of the frequency to be measured, a mechanical rectifier energized by the frequency to be measured, a cross coil apparatus, and connections between the measuring coil of said apparatus and said resonance circuit, said connections including the interrupter of said mechanical rectifier, the other coil of the said apparatus producing the directional force being supplied through a rectifier from the source of alternating current to be measured.

5. In a frequency measurer a resonance circuit tuned to the proper value of the frequency to be measured, a mechanical rectifier energized by the frequency to be measured, and connected in series with the measuring coils of an ampere-hour meter serving as measuring apparatus sensitive to current direction and driving a current impulse transmitter.

6. In a frequency measurer a resonance circuit tuned to the proper value of the frequency to be measured, a mechanical rectifier energized by the frequency to be measured, and connected in series with the measuring coils of an ampere-hour meter serving as measuring apparatus sensitive to current direction and driving a current impulse transmitter and means for imparting to the ampere-hour meter a constant turning moment upon which is superposed the turning moment to be measured arising from the rectified sections of current.

7. In a frequency measurer a resonance circuit tuned to the proper value of the frequency to be measured, a mechanical rectifier energized by the frequency to be measured, and connected in series with the measuring coils of an ampere-hour meter serving as measuring apparatus sensitive to current direction and driving a current impulse transmitter and means for adjusting the energizing phase of the mechanical rectifier so that the direct current does not change its direction over the desired measurement range.

8. In a frequency measurer a resonance circuit tuned to a mean value of the range of frequencies to be measured, a mechanical rectifier having an energizing coil connected to be fed by the alternating current to be measured, a direct current measuring instrument, and connections between said instrument and the said resonance circuit, said connections including the interrupter of said mechanical rectifier.

In testimony whereof I affix my signature.
GEORG KEINATH.